US 6,739,619 B2

(12) United States Patent
Mueller

(10) Patent No.: US 6,739,619 B2
(45) Date of Patent: *May 25, 2004

(54) AIR BAG DEVICE, PRODUCTION METHOD OF AN AIR BAG DEVICE, ACTIVATION METHOD OF AN AIR BAG DEVICE AND VEHICLE WITH AN AIR BAG DEVICE

(75) Inventor: Olaf Mueller, Ruesselsheim (DE)

(73) Assignee: Autoliv Development AB, Vargarda (SE)

(*) Notice: Subject to any disclaimer, the term of this patent is extended or adjusted under 35 U.S.C. 154(b) by 0 days.

This patent is subject to a terminal disclaimer.

(21) Appl. No.: 10/384,326

(22) Filed: Mar. 7, 2003

(65) Prior Publication Data

US 2003/0146609 A1 Aug. 7, 2003

Related U.S. Application Data

(62) Division of application No. 09/932,341, filed on Aug. 17, 2001, which is a division of application No. 09/915,149, filed on Jul. 24, 2001, now Pat. No. 6,502,854, which is a continuation of application No. 09/176,941, filed on Oct. 22, 1998, now abandoned.

(30) Foreign Application Priority Data

Oct. 22, 1997 (DE) .......................... 297 18 801

(51) Int. Cl.[7] .............................................. B60R 21/22
(52) U.S. Cl. .................................. 280/730.2; 280/728.2
(58) Field of Search ..................... 280/730.2, 730.1, 280/743.1, 728.2, 736, 742; 296/214

(56) References Cited

U.S. PATENT DOCUMENTS 4,986,569 A * 1/1991 Bruton .................... 280/728.2
5,788,270 A * 8/1998 H.A land et al. ........... 280/729
5,857,696 A * 1/1999 Inoue et al. .............. 280/728.2
5,865,462 A * 2/1999 Robins et al. ........... 280/730.2
5,868,420 A * 2/1999 Higashiura et al. ...... 280/730.2
5,884,937 A * 3/1999 Yamada .................... 280/730.2
5,899,489 A * 5/1999 Jost ........................ 280/730.2
6,000,715 A * 12/1999 Tschaeschke ............ 280/730.2
6,042,141 A * 3/2000 Welch et al. ................ 280/729
6,170,860 B1 * 1/2001 Denz et al. .............. 280/730.2
6,568,706 B2 * 5/2003 Mueller .................... 280/730.2

FOREIGN PATENT DOCUMENTS

DE      296 14 201 u1    * 11/1996
DE      29709389 U1      *  9/1997    .......... B60R/21/02
GB      2 314 300 A      * 12/1997

* cited by examiner

*Primary Examiner*—David R. Dunn
(74) *Attorney, Agent, or Firm*—Martin Fleit; Paul D. Bianco; Fleit Kain Gibbons Gutman Bongini & Bianco, P.L.

(57) ABSTRACT

This invention relates to an air bag system for accommodation behind a vehicle covering. The air bag system contains an air bag, which advances in a main inflating direction when the air bag system is triggered, and a gas generator for supplying the air bag with pressure gas during triggering of the air bag system. The gas generator and the air bag are connected by a gas distributing duct which extends at least partially at an angle with respect to the main inflating direction of the air bag. In this case, the gas distributing duct is formed of air bag material. Furthermore, the invention relates to a manufacturing process and a triggering process for such an air bag system as well as to a motor vehicle having such an air bag system, of which at least the air bag is arranged on a sliding roof frame part.

17 Claims, 9 Drawing Sheets

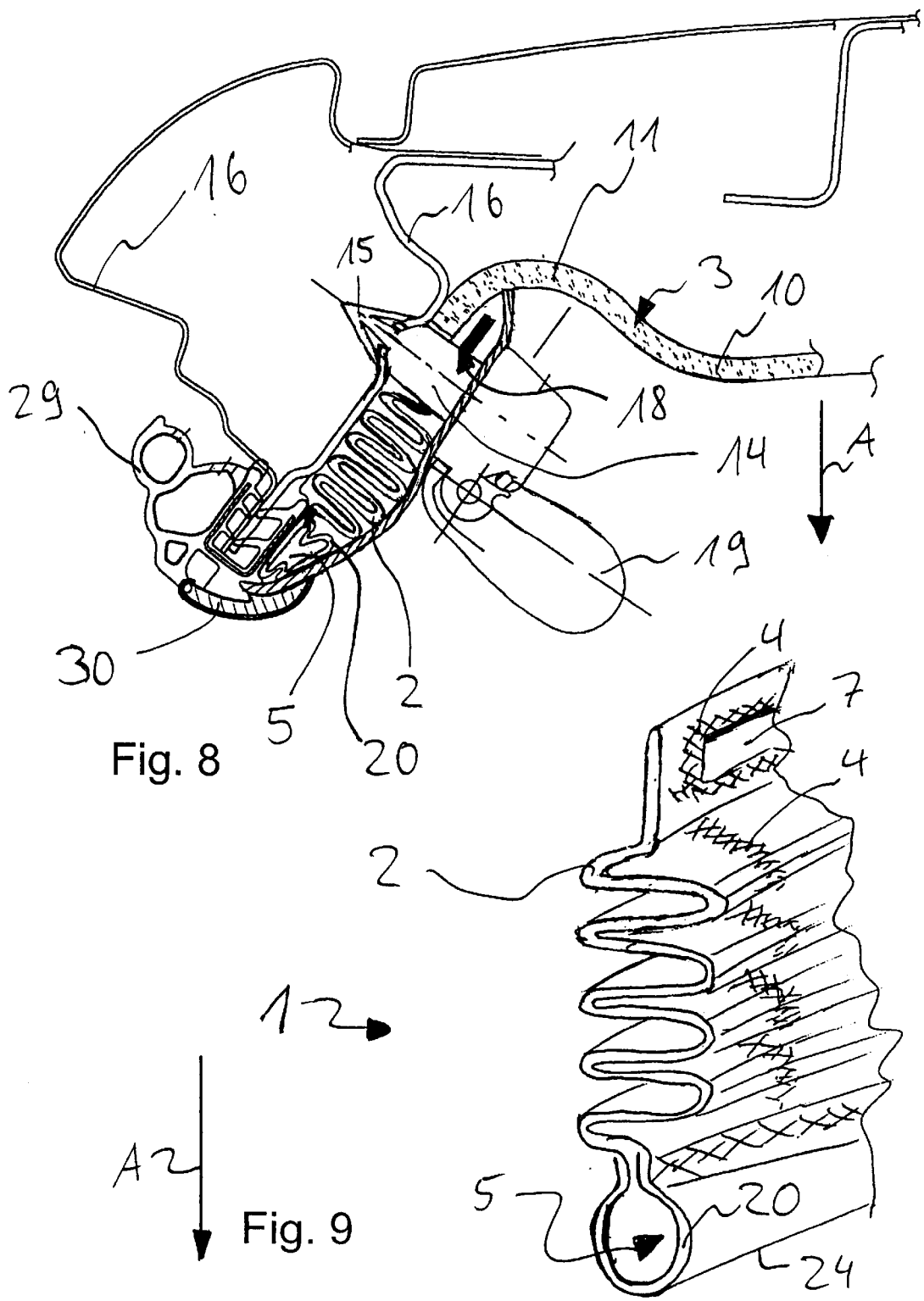

AIR BAG DEVICE, PRODUCTION METHOD OF AN AIR BAG DEVICE, ACTIVATION METHOD OF AN AIR BAG DEVICE AND VEHICLE WITH AN AIR BAG DEVICE

CROSS REFERENCE TO RELATED APPLICATIONS

This application is a divisional of earlier filed application Ser. No. 09/932,341 filed Aug. 17, 2001 (allowed), which is a divisional of earlier filed application Ser. No. 09/915,149 filed Jul. 24, 2001, which is a continuation of earlier filed application Ser. No. 09/176,941 filed Oct. 22, 1998, now abandoned. The earlier filed applications are here incorporated by reference in their entirety.

BACKGROUND OF THE INVENTION

1. Field of the Invention

This invention relates to a particular air bag system. Furthermore, the invention relates to a particular air bag system manufacturing process as well as to a particular triggering process for an air bag system. Finally, a motor vehicle having at least one air bag system also forms part of the invention.

The invention basically comprises, among other elements, side air bags and roof air bags in an automobile and their housings.

2. Description of Related Art

European Patent Document EP 97 102 307.2 discloses a side impact protection device for vehicle occupants in which an air bag, in the folded ready condition, is arranged behind a covering part on the roof frame of a vehicle. This is a head gas bag which, while folded in an elongated manner, is situated behind the covering part as long as it is not triggered. In this case, a gas generator is integrated directly in the gas bag and extends maximally along one third of the gas bag. It is a disadvantage in this case that the mounting site of the gas generator is limited. Specifically, if the mounting site is situated in a forward or rearward end area of the gas bag, then an unfavorable inflation performance of the gas bag may result, which may cause the gas bag to reach its inflated condition incompletely or too late.

This can be avoided by means of an air bag according to German Patent Document DE 196 42 964.1. This air bag system for a motor vehicle contains an air bag consisting of an inflatable gas cushion, a gas generator for filling the air bag, a gas guiding tube which extends through a partitioned-off area of the air bag and has blow-out openings, a profile strip with a discharge duct constructed therein, in which the air bag, folded in a stack shape, is accommodated, and fastening elements for holding the constructional unit consisting of the profile strip, the air bag and the gas guiding tube. Although, by way of its blow-out openings, the gas guiding tube permits a targeted filling of the air bag when the air bag is triggered, the gas guiding tube and its mounting cause additional expenditures which make the whole air bag system significantly more expensive.

SUMMARY OF THE INVENTION

It is therefore an object of the present invention to provide an air bag system in which the air bag can be inflated in a targeted manner without significant additional expenditures.

This object is achieved by way of the particularly claimed air bag system, the particularly claimed air bag system manufacturing process, the particularly claimed triggering process for an air bag system and a motor vehicle as particularly claimed.

Another problem existing in the prior art is known, for example, from two older German Patent Applications DE 196 04 055.8 and DE 196 32 222.7 by the same applicant as that of the present application. This problem relates to the fastening of the air bag system on a vehicle roof with an integrated sliding roof. A remedy for this problem is provided by the present invention.

Preferred and advantageous further developments of individual implementations of the invention will also be apparent.

Without limitation, the present invention comprises, in addition to the preferred embodiments indicated in the description and the characteristics and combinations of characteristics indicated in the claims, all concepts, principles and generalizations which a person skilled in the art can easily recognize. Also, the complete contents of German Patent Applications DE 196 04 055.8 and DE 196 32 222.7, European Patent Document EP 97 102 307.2, and German Patent Document DE 196 42 964.1 are incorporated by reference into this application and become part of the disclosure content of this document.

As a result of the invention, an air bag system is provided for accommodation behind a vehicle covering. The air bag system contains an air bag which, when the air bag system is triggered, advances into a main inflating direction, and a gas generator for supplying the air bag with pressure gas during triggering of the air bag system. The gas generator and the air bag are connected by a gas distributing duct which extends at least partially at an angle with respect to the main inflating direction of the air bag. In this case, the invention provides that the gas distributing duct is formed of the air bag material.

According to the invention, the gas distributing duct, which provides an optimal distribution of the pressure gas from the gas generator and therefore an optimal inflating performance of the air bag, is formed directly of the air bag material. Thus, in contrast to the gas guiding duct of the prior art, no additional parts are required for forming the gas distributing duct. The labor expenditures for manufacturing the gas distributing duct are also not considerable since the gas distributing duct can be constructed directly while manufacturing the air bag in one work step which, as a rule, can take place simultaneously with other machining operations during manufacture of the air bag.

The gas distributing duct preferably extends at least essentially transversely to the main inflating direction of the air bag.

Although the gas distributing duct can also be mounted on the air bag, it is advantageous and therefore preferred for the gas distributing duct to be constructed integrally with the air bag. As a result, the whole air bag, together with the integrated gas distributing duct, can be manufactured in one operation from the air bag material.

In order to achieve a sufficiently stable gas distributing duct, the gas distributing duct is preferably formed by a two-layer or multi-layer air bag material. This may be further developed by forming the two-layer or multi-layer air bag material of the gas distributing duct by foldings of the air bag material. Such foldings can be implemented directly in the continuous machining and manufacturing process.

Preferably, the gas distributing duct is formed by welded connections, glued connections, sewn connections or woven connections of two or more layers of air bag material, and gas passage openings are left between the welded connections, glued connections, sewn connections or woven connections.

Additional stabilizations in possible critical areas of the gas distributing duct which are highly stressed by the flowing pressure gas may advantageously be achieved by inserted reinforcements. In particular, reinforcements may be placed in the gas distributing duct in the area of the inflow opening of pressure gas from the gas generator and/or in areas in which the gas distributing duct has a curved course.

For the accommodation of at least the air bag of the air bag system according to the invention, a suitable space is already made available by a vehicle covering, such as an inside lining and, particularly, a roof lining of a vehicle. In order to ensure that the air bag will not be loose in this space, covering and fastening devices are preferably contained so that the folded air bag can be accommodated in its ready position. Preferred covering and fastening devices contain at least one layer of a nonwoven material or paper by which the folded air bag can be accommodated in its ready position. In particular, materials and constructions are used for the covering and fastening devices which cause no noise such as squeaking. Furthermore, it is preferred to have the covering and fastening devices fixedly connected with the air bag and/or the vehicle covering. Preferably, the covering and fastening devices are glued to the air bag and/or the vehicle covering. This permits a premounting of the air bag or of the whole air bag system on a vehicle covering such as that on a vehicle ceiling.

When fastening elements used for the simultaneous fastening of the vehicle covering and the air bag system, or at least the air bag, on other vehicle parts are provided, an easy mounting with a minimal number of parts is permitted if the air bag or the air bag system is not premounted on the vehicle covering, as described above. Also, with premounted units consisting of the vehicle covering and the air bag or air bag system according to the above description, a particularly stable fastening of such constructional units on vehicle parts is achieved, since the air bag or the air bag system are included in the fastening.

In a particularly advantageous manner, the gas distributing duct may be arranged on the side of the air bag which advances during the triggering of the air bag system and appears first from behind the vehicle covering. As a result of this further development, the first inflating of the gas distributing duct during triggering of the air bag system can be utilized for opening-up the vehicle covering. This is particularly advantageous because the gas pressure in the gas distributing duct is particularly high initially and therefore easily opens or detaches the vehicle covering so that the air bag itself will then no longer require a large amount of force to emerge through the corresponding opening. The most important advantage is a shorter inflating time of the air bag so that it can have an earlier protective effect.

It is also preferred to provide fastening passage holes in the gas distributing duct and/or the air bag itself which are formed by welded connections, glued connections, sewn connections or woven connections and are sealed off with respect to the interior of the gas distributing duct or the air bag itself. Tension folds of the air bag can also be formed by welded connections, glued connections, sewn connections or woven connections. This facilitates the fastening of the air bag, in which case the corresponding fastening passage holes can be produced directly while establishing the welded connections, glued connections, sewn connections or woven connections for forming the gas distributing duct and the gas passage openings. Separate expenditures, therefore, are not required. The same applies to tension folds in the air bag which optimize its shape and inflating performance.

Within the scope of the manufacturing process of an air bag system according to the invention, a gas distributing duct is formed in an air bag by a welded, glued, sewn or woven connection of the air bag material, which gas distributing duct extends at least partially at an angle with respect to the main inflating direction of the air bag. Between the welded, glued, sewn or woven connections, gas passage openings are left. As a result, the above-mentioned air bag system or its air bag can be produced and the above-explained advantages are achieved.

Reference has also been made to the advantages provided during the manufacturing process of an air bag system when, simultaneously with the welded, glued, sewn or woven connections for forming the gas distributing duct, fastening passage holes and/or tension folds are formed. The fastening passage holes are sealed off with respect to the interior of the gas distributing duct and/or of the air bag, and the tension folds are formed by the welding-together, gluing-together, sewing-together or weaving-together of the air bag material.

The same applies to the further development of the manufacturing process according to which, before providing the welded, glued, sewn or woven connection, the air bag material is folded to form the gas distributing duct in order to have two or more layers in the area of the gas distributing duct.

For achieving the above-mentioned objects, the invention also provides a triggering process for an air bag system which contains an air bag accommodated behind a vehicle covering. In this process, gas is guided from a gas generator into a gas distributing duct made of air bag material situated behind the vehicle covering. The inflating gas distributing duct has already opened up the vehicle covering at least partially such that the air bag can emerge. The corresponding effects and advantages are described above.

A preferred further development of the triggering process is that the inflating gas distributing duct detaches the vehicle covering at least partially from the vehicle parts covered by it so that the air bag can emerge between the vehicle covering and the vehicle parts covered by it.

The invention also comprises a motor vehicle with at least one air bag system as mentioned above according to the invention. In such a motor vehicle, the air bag is mounted in a folded condition as a package optionally by covering and fastening devices on a vehicle covering of the motor vehicle. In addition or as an alternative, the air bag can be fastened in a folded-together condition as a package optionally by covering and fastening devices as well as fastening elements, together with the vehicle covering of the motor vehicle, on other parts of the motor vehicle.

As mentioned above, the vehicle covering is a prefabricated ceiling of the vehicle.

The advantages described above which occur when the air bag is mounted in a folded-together condition as a package, optionally by the covering and fastening devices on a vehicle part, apply to the whole claimed motor vehicle.

According to a further preferred embodiment of the invention, the vehicle part is a frame part of a sliding roof. In this case, the air bag or the air bag system may also be accommodated in a housing, for which, for example, the frame part of the sliding roof can be utilized.

According to preferred further developments, the frame part of the sliding roof is a side member which extends in the longitudinal direction of the vehicle and on which a side air bag is mounted, and/or the frame part of the sliding roof is a cross member which extends in the transverse direction of the vehicle. An air bag is mounted on the frame part for protection between occupants sitting in the front and the rear or for closing the sliding roof opening. In the latter version, the air bag for closing the sliding roof opening preferably has a T-shaped cross-section relative to the longitudinal direction of the vehicle so that the vertical part of the air bag is used for providing a protective cushion between occupants sitting in the left front and in the right front when the air bag system is triggered. Air bag slide rails can additionally or alternatively be provided along the sliding roof cover slide rails for the air bag for closing off the sliding roof opening, and guiding devices can be provided on the air bag for guiding this air bag in the air bag slide rails during triggering of the air bag system.

Finally, the invention contains an air bag system having a gas generator and an air bag, in which case the air bag, with or without a housing, can be mounted on a frame part of a sliding roof.

A further development of the above will be described in the context of the motor vehicle according to the invention. Specifically, the air bag is a side air bag and the frame part is a side member which extends in the longitudinal direction of the vehicle. The air bag may be an air bag for protection between sitting occupants in the front and in the rear or an air bag for closing the sliding roof opening. The frame part of the sliding roof may be a cross member which extends in the transverse direction of the vehicle. In a particular embodiment, the air bag for closing the sliding roof opening, in a condition installed in the vehicle and inflated, may have a T-shaped cross-section. The latter can be further developed by providing air bag slide rails and guiding devices on the air bag for guiding the air bag into the air bag slide rails during triggering of the air bag system. The air bag slide rails can be mounted at least essentially along sliding roof cover slide rails.

The two German Patent Applications mentioned above (DE 196 04 055.8 and DE 196 32 222.7), also by the present applicant, relate to an inside lining for a vehicle roof for accommodating roof air bag systems. In this respect, as well as with respect to the objects of European Patent Document EP 97 102 307.2 and of German Patent Document DE 196 42 964.1, the present invention provides further improvements and advantageous supplementations and alternatives. To the extent that characteristics from the older applications mentioned above can be combined with the present invention, the contents of the two German Patent Applications DE 196 04 055.8 and DE 196 32 222.7 as well as of European Patent Document EP 97 102 307.2 and of German Patent Document DE 196 42 964.1 are incorporated completely in the present document by reference in order to avoid a direct complete repetition of their contents.

BRIEF DESCRIPTION OF THE DRAWINGS

The invention will be described in detail in the following with reference to the drawings.

FIG. 8 is a schematic sectional view of a fourth embodiment of an air bag system with a folded air bag accommodated on a vehicle behind a vehicle covering in the form of a vehicle ceiling;

FIG. 9 is a perspective schematic view of a portion of an air bag of the fourth embodiment of the air bag system;

DESCRIPTION OF THE PREFERRED EMBODIMENTS

In the individual figures of the drawings, which explain the essence of the invention in detail by way of embodiments, the same or similar parts which have the same or similar effects have the same reference numbers. In addition, the drawings are considered to disclose those characteristics which are not explicitly mentioned or explained in the following description or which do not have reference numbers but are understandable for and can be recognized by a person skilled in the art particularly in conjunction with characteristics described above on the basis of technical knowledge, as a result of their representation.

Figure 1:
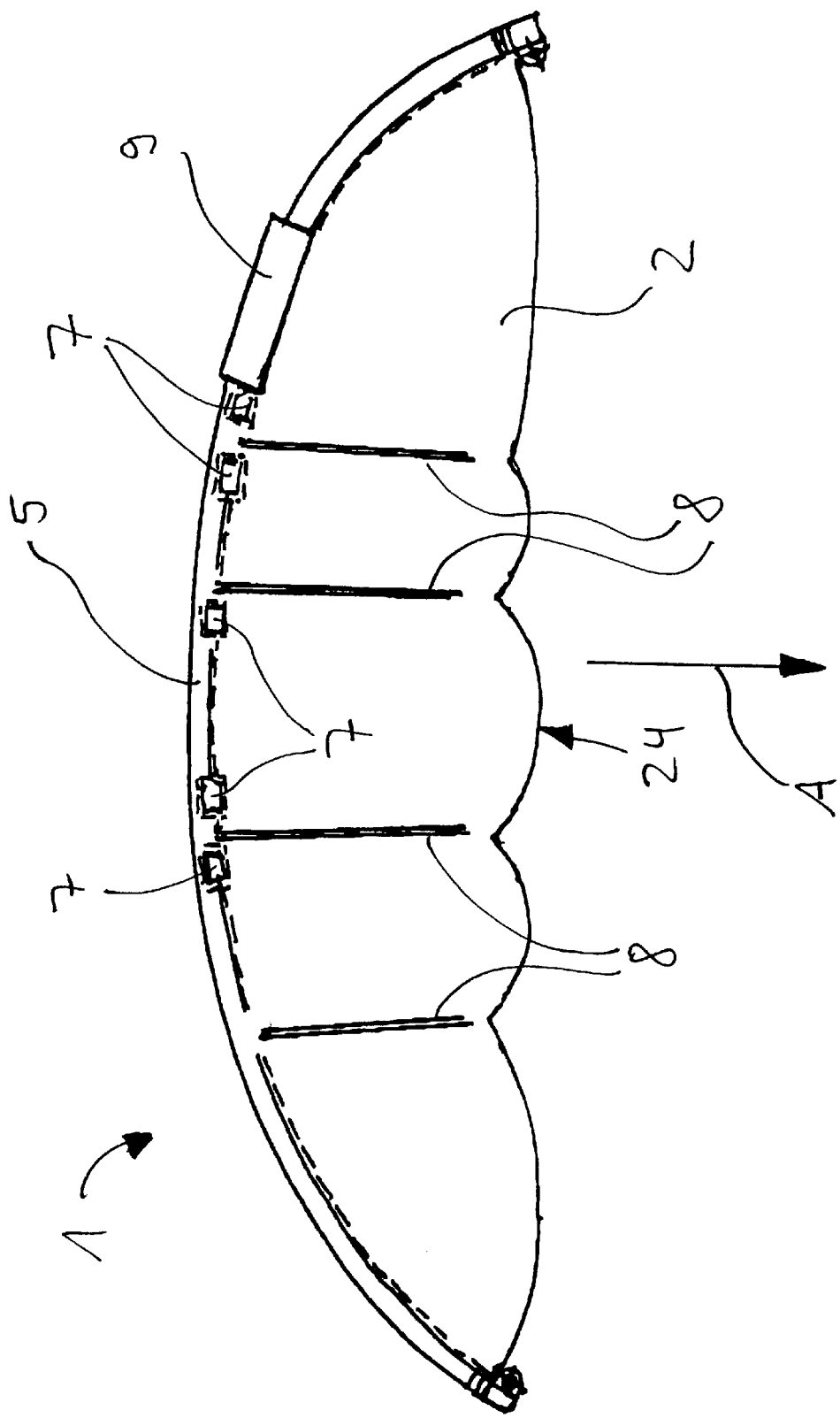
FIG. 1 is a schematic lateral view of a first embodiment of an air bag system with an inflated air bag.

FIG. 1 illustrates a first basic variant of an air bag system 1 with an inflated side air bag as a module with a prefabricated ceiling 3 for a vehicle in a lateral view. FIG. 1 shows the finished side air bag 2 in the inflated condition with welded connections 4, to which reference will be made in conjunction with FIG. 7. By the welded connections or weld-ins 4, a gas distributing duct 5, which may also be called a pressure distributing duct, and, on its border to the actual air bag 2, gas passage openings 6 from the gas distributing duct 5 to the actual air bag 2 are produced from the material of the air bag 2. In addition, fastening passage holes 7 as well as tension folds 8 are produced from the material of the air bag 2. This can all be implemented in a single operation which, among others, may also contain the folding of the air bag 2 in its ready or mounted condition.

A gas generator 9 is mounted laterally on the gas distributing duct 5 which supplies the air bag 2 with pressure gas through the gas distributing duct during triggering of the air bag system.

The main inflating direction of the air bag 2 is indicated by the arrow A in FIG. 1.

Figure 2:
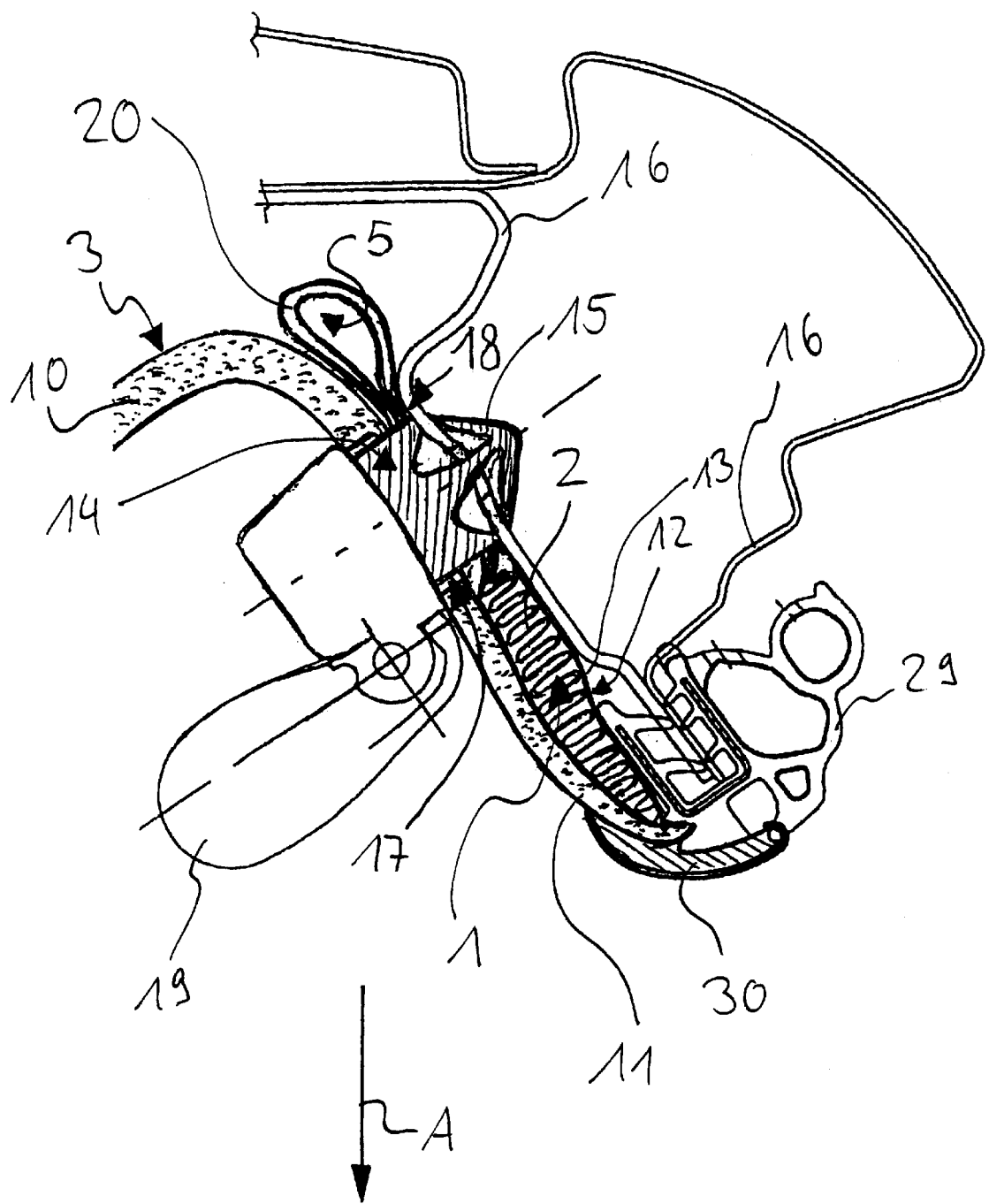
FIG. 2 is a schematic sectional view of a second embodiment of an air bag system with a folded air bag accommodated on a vehicle behind a vehicle covering in the form of a vehicle ceiling.
Figure 3:
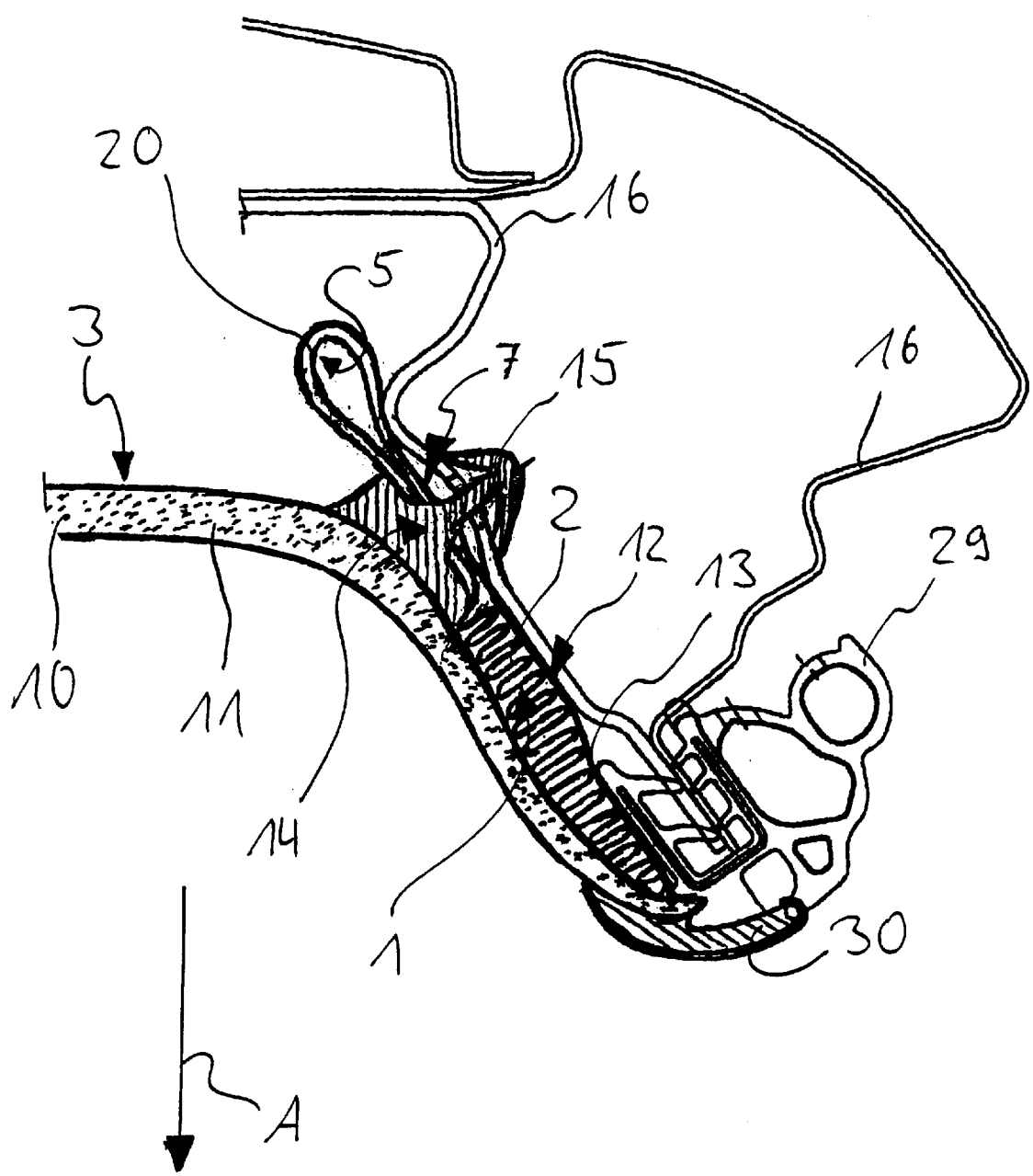
FIG. 3 is a schematic sectional view of the second embodiment of an air bag system with a folded air bag accommodated on a vehicle behind a vehicle covering in the form of a vehicle ceiling which is similar to the view of FIG. 2 but at a different point with respect to the sectional plane of FIG. 2.
Figure 4:
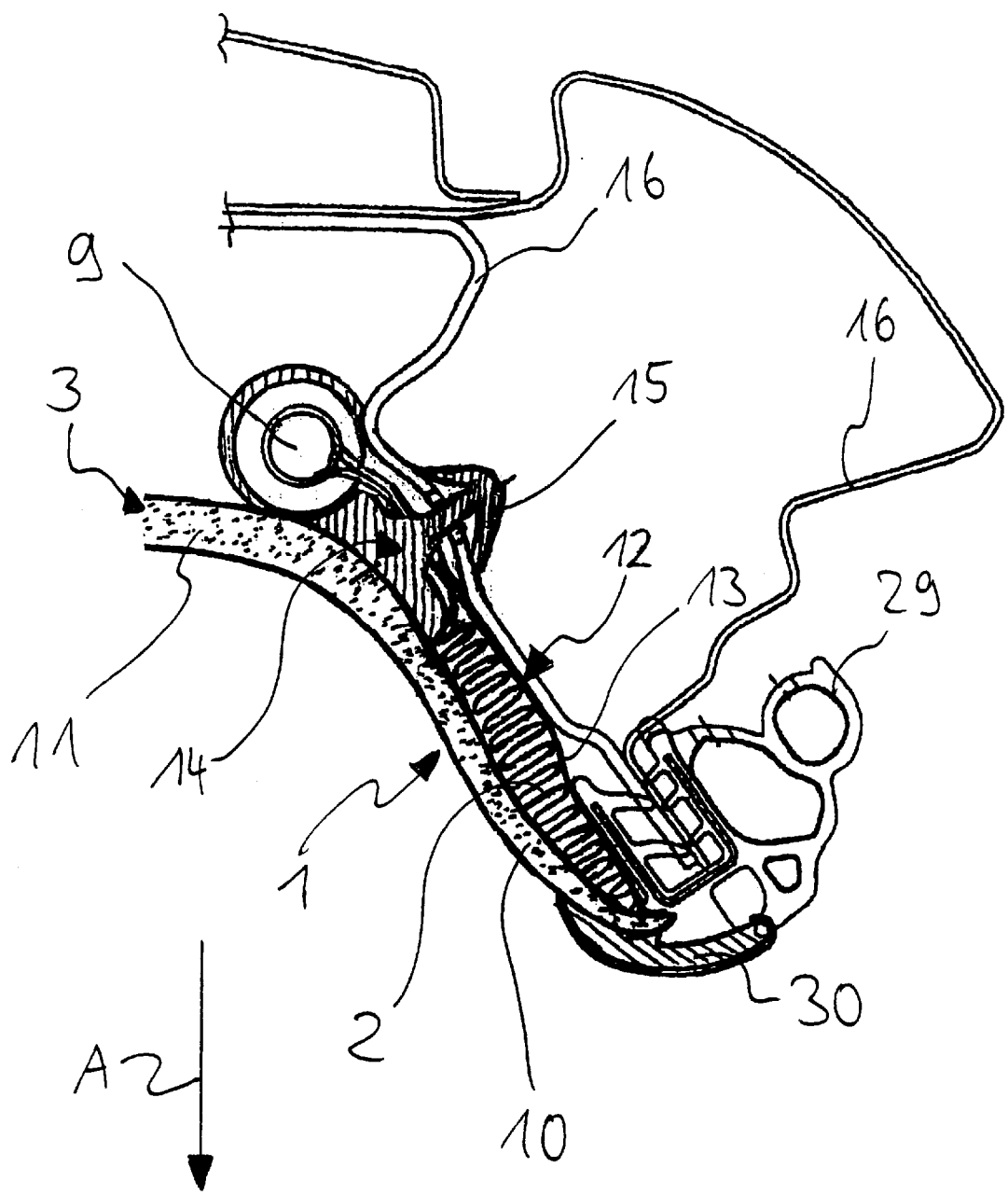
FIG. 4 is a schematic sectional view of the second embodiment of an air bag system with a folded air bag accommodated on a vehicle behind a vehicle covering in the form of a vehicle ceiling which is similar to the view of FIG. 2 but at a different point with respect to the sectional planes of FIGS. 2 and 3.

The schematic sectional representation of a second embodiment of the air bag system 1 in FIGS. 2 to 4 illustrates the housing of the air bag 2 behind a vehicle covering 10 in the form of a vehicle ceiling 11 as well as the covering and fastening of the air bag 2 on the vehicle ceiling 11. For this purpose, covering and fastening devices 12 are provided which may contain a nonwoven or paper layer 13 as well as fastening elements 14 in the form of clips. The nonwoven or paper layer 13 has the purposes of fastening the air bag 2, folded in its ready position, to the vehicle ceiling 11, holding the air bag 2 there in a secure manner and covering the air bag with respect to other vehicle parts, such as the frame part 16. The clips 15, which are fitted through mounting holes 17 of the vehicle ceiling 11, additionally fix the air bag 2 in its position on the frame part 16, because the fastening passage holes 7 are aligned with the mounting holes 17. No holes for guiding the clips 15 through have to be prefabricated in the nonwoven or paper layer 13 because the clips 15 can simply be pressed through such materials.

The fastening of the air bag 2 to the vehicle ceiling 11 takes place by gluing the nonwoven or paper layer 13 to the vehicle ceiling 11. Because of this glued connection of the nonwoven or paper layer 13 with the vehicle ceiling 11 constructed as a prefabricated ceiling 3, during the welding-in of the gas distributing duct 5, care must be taken to surround all fastening passage holes or clip receiving holes 7 and, as required, all roof holding grip fastening passage holes 18 as well by welding for the purpose of tightness. The gas generator 9 can also be welded in or subsequently glued in, or its connections (not shown) can be welded on. In the event of a crash, the air bag 2 is held by means of the clips 15 which are positioned and adapted to shapes.

FIG. 2 is a sectional view of the roof frame. In a positioned manner, the folded air bag 2 is fastened as a package by a covered woven textile, nonwoven, or paper material 13 or the like on the vehicle ceiling 11. The vehicle ceiling may be constructed as a preform ceiling or a pre-fabricated ceiling 3. The pressure distributing or gas distributing duct 5 is situated on the upper end of the air bag 2.

The sectional view of FIG. 2 illustrates that the roof holding grip 19 is also provided with a foot which is constructed as a clip 15. This clip 15, by which the roof holding grip 19 is fixed to the frame part 16, is simultaneously used for fixing the vehicle ceiling 11 and the air bag 2 in their positions on the frame part 16. FIG. 2 shows the roof air bag which is glued to the prefabricated ceiling 3 or the vehicle ceiling 11 and which is constructed as a side air bag 2, with the passage or fastening passage hole 7 for the foot clip 15 of the roof holding grip 19.

In general, as a connection possibility or boundary possibility for the further development of the gas distributing duct 5, the gas passage openings 6, the fastening passage holes 7 and the tension folds 8, instead of the indicated welded connection or welding-in, a sewing or taking-in, a gluing or woven connection can be carried out. In the case of the woven connection, two woven layers are woven flatly onto one another and a sealed connection is produced in this manner.

FIGS. 3 and 4 are sectional views at different points of the embodiment of the air bag system 1 illustrated in FIG. 2. FIG. 3 shows a point at which no roof holding grip 19 is present. FIG. 4 shows the positioning of the gas generator 9. Accordingly, it is in particular also possible to fasten the gas generator 9 on the prefabricated ceiling 3 or vehicle ceiling 11 instead of, as is customary nowadays, screwing it separately to the end of the air bag 2.

Figure 5:
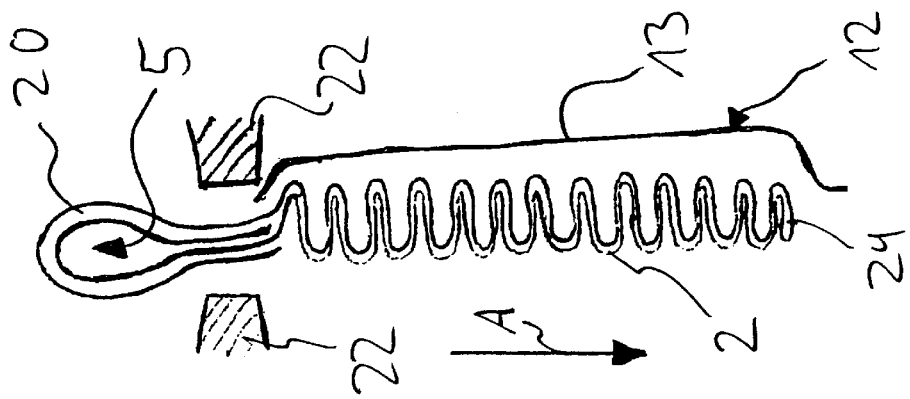
FIG. 5 is a schematic sectional view during manufacturing of the air bag of an air bag system according to the invention.

As a special characteristic of the invention, FIG. 5 shows a double-walled gas distributing duct 5 during manufacturing of the air bag 2. The gas distributing duct 5 is produced by a folding of the woven air bag fabric or material, specifically in the case of the illustrated version, by woven air bag fabrics folded over one another in opposite directions. The double wall is an advantageous protection against the high pressure of the gas in the gas distributing duct 5. In the sectional representation, the folding-over of the woven fabric forms a loop 20 which holds the gas distributing duct 5 open. This is important for the necessary velocity of the gas when emerging from the gas generator 9 and during the passage through the gas distributing duct 5 for entering into the actual air bag 2.

Figure 6:
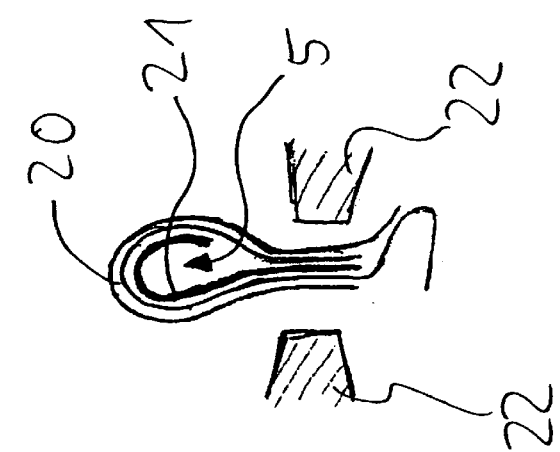
FIG. 6 is a schematic, partially sectional view during manufacturing of the air bag of an air bag system according to the invention with a reinforcement in the gas distributing duct.

If the opening cross-section of the loop 20, particularly in the case of a change of direction of the gas distributing duct 5, for example, in the case of bends, does not remain large enough, an opening device or a reinforcement 21 can be welded on, sewn on, etc., as illustrated schematically in FIG. 6. FIGS. 5 and 6 only show examples of welding electrodes 22. Furthermore, FIG. 5 shows a paper attachment 13 which is glued to the folded air bag 2 and later to the prefabricated ceiling 3 or the vehicle ceiling 11. At the inflow end (not shown) of the pressure or gas distributing duct 5 made of the woven fabric of the air bag 2, the gas distributing duct 5 may also be correspondingly reinforced by inserts or reinforcements 21 or similar devices.

Figure 7:
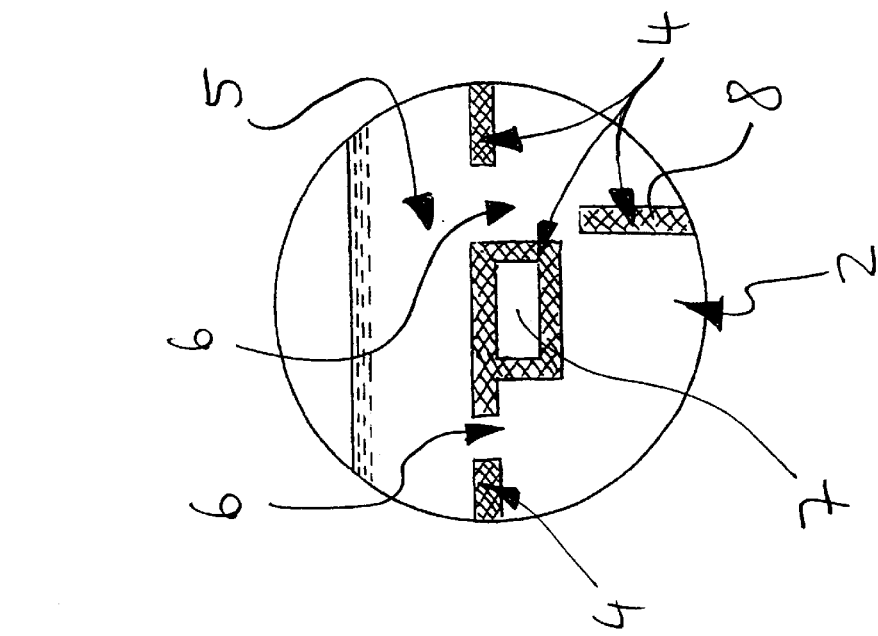
FIG. 7 is a schematic and enlarged lateral view of a third embodiment of a portion of the air bag and of the gas distributing duct with welded connections.

The welding-in and the not-welding-in along the gas distributing duct 5, as illustrated in FIG. 7, results in the desired gas distribution which, corresponding to results obtained by tests, is designed according to the vehicle and the requirements. In this case, the welding-in/gluing-in/taking-in/weaving 4 is designed such that clip or fastening passage holes 7 are sealed off, longitudinal folds or tension folds 8 for the tensioning of the air bag are formed, outflow or gas passage openings 6 of a corresponding size are formed by means of a single operation such as a welding operation. The loop 20, which forms the gas distributing duct 5, is situated above a fastening line of the air bag 2 in the area between the vehicle roof 23 (see, for example, FIGS. 2 to 4) and the prefabricated ceiling 3 or vehicle ceiling 11.

Another alternative to the above-mentioned first basic principle consists of mounting the gas distributing or pressure duct 5 at the lower end 24 (compare FIG. 1) of the air bag 2 according to FIGS. 8 and 9. This lower end 24 of the air bag 2 is the side of the air bag 2 which, when the air bag system 1 is triggered, comes out first from behind the vehicle covering 10, such as the vehicle ceiling 11; the gas distributing duct 5 will "hang" on the lower end 24. As a result, the gas distributing or pressure duct 5 can be used for ripping the covering 10 away which is advantageous for the fast and locally targeted exiting of the air bag 2. The inflating velocity will also be faster since the air bag 2 can freely unfold already in the inflating stage and must not first open the covering 10 itself and press it away, for example, on a lower edge (not shown). The pressure duct 5 can therefore be folded, for example, under a pretensioning and can be placed at the site where it is simultaneously used for ripping away the covering 10. Normally, a 100-fold pressure exists in the pressure or gas distributing duct 5 at the start of the ignition. The gas passage and the required folding must be coordinated with one another for optimal functioning. In this fourth embodiment, the air bag 2 is glued in its position by paper 13 in the covering 10.

For the present state of the art, it is typical to accommodate the air bag in a housing with an integrated tube-type pressure supply as a module for accommodation under roof linings (prefabricated ceiling or covering cushion). The present invention, as illustrated by means of the above-explained embodiments, is used for the same purpose but has a simpler construction.

In the following, several general principles and embodiments of the invention will be indicated.

After the initial folding-together of the air bag 2 for mounting, the folds can be held by a glued-on paper 13 or similar device. Such a paper 13 may protrude over the folded air bag 2, may be used for gluing the air bag 2 to the prefabricated ceiling 3 and may simultaneously be used as an anti-squeak device with respect to the sheet metal roof 23.

The gas generator 9 or, as an alternative, its connections (not shown) can be welded together during manufacturing of the air bag 2 with the gas distributing duct 5 in a positioned manner.

Another accommodation alternative of the roof air bag design is the fastening of the air bags or air bag systems on sliding roof frames. In the case of vehicles without a sliding roof, the solution described in German Patent documents DE 196 04 055.8 and DE 196 32 222.1 can be used. As an expansion of the variant for accommodating two lateral air bags customary today, a variant will be described in the following which has four air bags 2.

Figure 10:
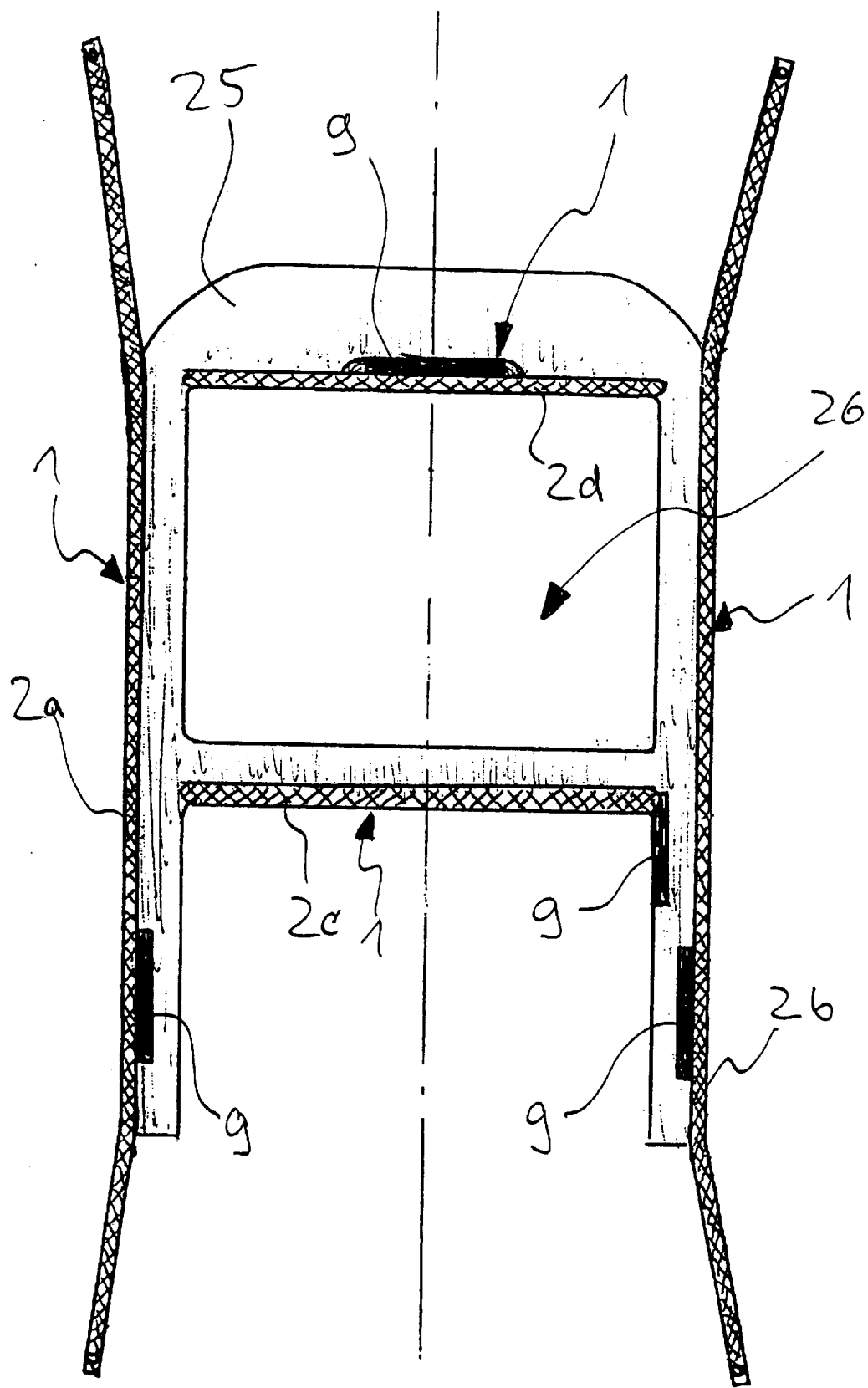
FIG. 10 is a schematic top view of an embodiment of a sliding roof frame with air bag systems arranged on it.

FIG. 10 shows a sliding roof frame 25 on which two lateral head air bags 2a, 2b, the air bag 2c between the front passenger and the rear passengers, and the air bag 2d, which closes a sliding roof opening 26, are fastened. The sliding roof air bag 2d is guided on the left and on the right in the sliding roof opening 26 in a slide rail (not shown) in parallel to the sliding roof cover (not shown). In the case of normal pyrotechnical ignition of the air bag system 1, because of the inflation, this sliding roof air bag 2d is pushed like a wall over the sliding roof opening 26. Preferably, the sliding roof air bag 2d is reinforced in its woven fabric such that it protects the occupants also in the event of a rollover.

Figure 11:
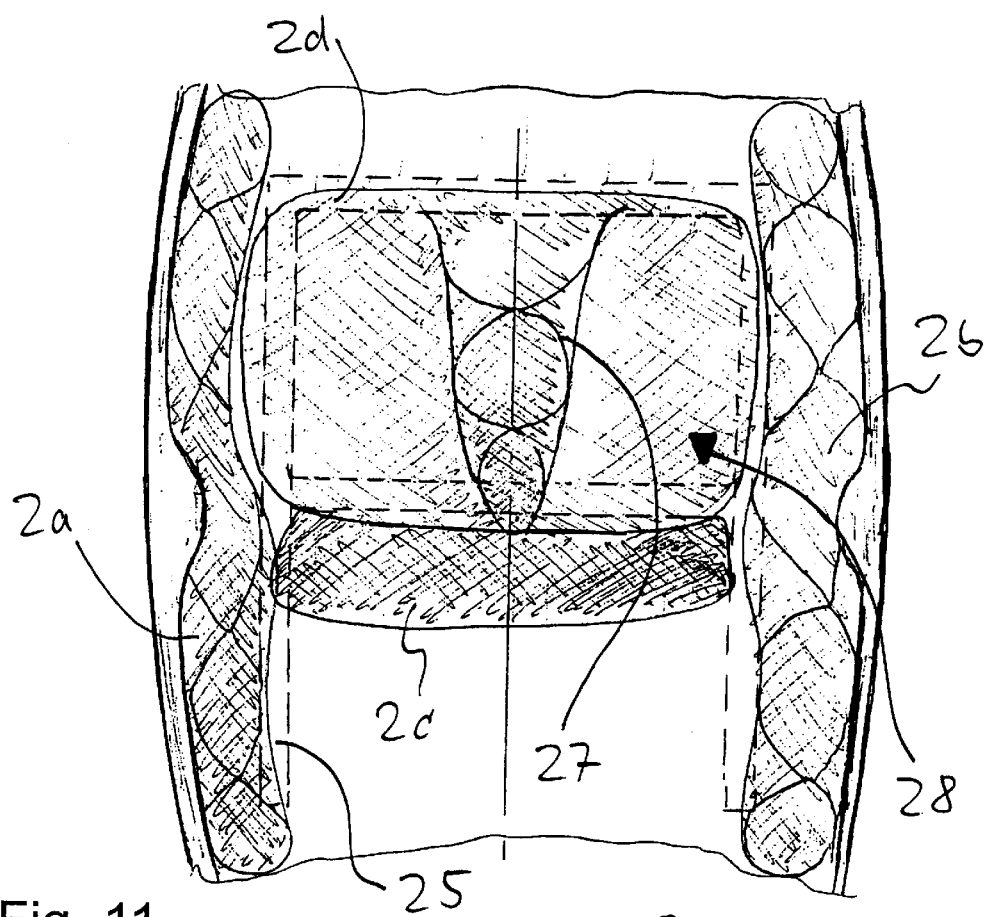
FIG. 11 is a schematic view from below the air bags of the air bag systems of FIG. 10 in inflated conditions.
Figure 12:
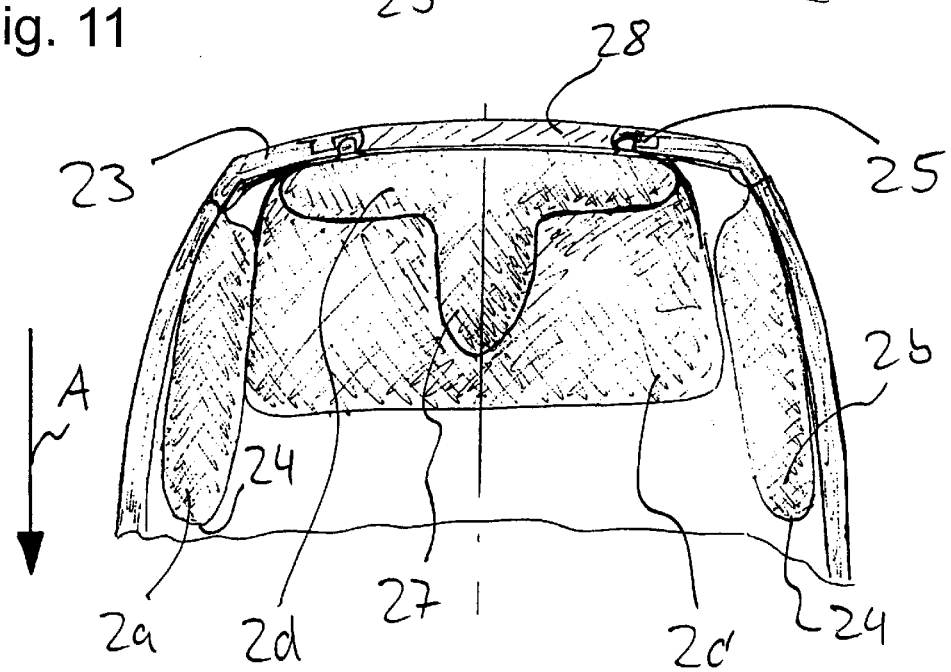
FIG. 12 is a schematic view from the front to the rear of the air bags of the air bag systems of FIG. 10 in inflated conditions.

FIGS. 11 and 12 illustrate another special characteristic of this sliding roof air bag 2d. The air bag has a T-shape together with the center piece 27 which, in the case of the inflated sliding roof air bag 2d, hangs downward. This has the purpose of protecting the left and the right occupant from one another in the event of a side impact.

Before the triggering, the air bags 2a, 2b, 2c and 2d are covered by the preform or prefabricated ceiling 3 or the roof cleats (not shown). The inflating of the air bag 2a, 2b, 2c, 2d preferably takes place by a folded pressure or gas distributing duct 5 which is mounted at the correct point and is described in conjunction with the first to the fourth embodiment. However, as in the prior art according to German Patent Document DE 196 42 964.1, air bags or air bag systems accommodated in so-called housings may advantageously be used in conjunction with the arrangement on a sliding roof frame 25, which is also within the scope of the invention, particularly if such housing are simultaneously frame parts of the sliding roof frame 25. Gas generators (see FIG. 10) for implementing a modular construction can also be accommodated on the sliding roof frame 25, the prefabricated ceiling 3 or the vehicle ceiling 11.

Figure 13:
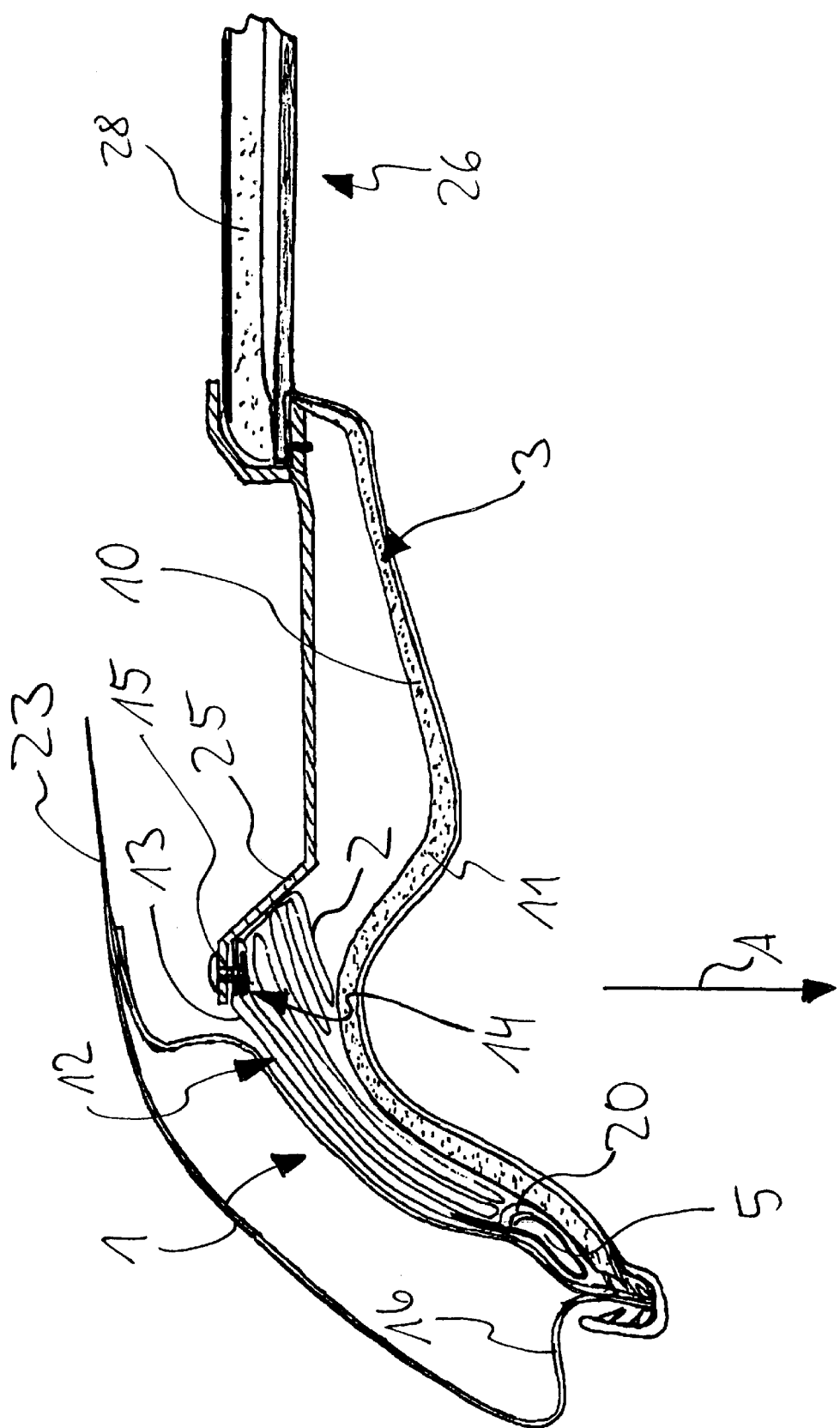
FIG. 13 is a schematic sectional view of a fifth embodiment of an air bag system with a folded air bag accommodated on a vehicle behind a vehicle covering in the form of a vehicle ceiling.

The structure of a sliding roof frame 25 is therefore suitable for linking and accommodating of head air bags, such as the air bags 2a, 2b, 2c and 2d. FIG. 13 is a schematic partial sectional view of a vehicle roof 23 with an air bag system 1 and a sliding roof 28.

Several general principles of the invention will now be indicated in connection with the accommodation of air bag systems 1 on a sliding roof frame 25.

Head air bags 2, 2b, 2c and 2d, including the gas generators 9, can be integrated on the sliding roof frame 25 of a sliding roof module.

By means of the pressure distributing duct 5, the edge of the prefabricated ceiling 3 of the covering 10 can be ripped loose. The sliding roof air bag 2d can be guided on the sliding roof frame 25, for example, by strips, guided suspensions or general guiding devices on the air bag 2d in combination with air bag slide rails.

The integration of several functions in one air bag 2d is possible. The covering of the sliding roof opening 26 and the sliding roof edges are covered and an intermediate air bag or center piece 27 are molded on for protecting the front occupants against a mutual impact in the event of a side crash.

Only for the purpose of completeness, it is indicated that reference numbers 29 and 30 in the figures denote a door weatherstrip or door sealing device of a vehicle door.

The invention is not limited to the described embodiments but comprises all implementation possibilities which a person skilled in the art can recognize by means of the present documents, including the disclosure contents of the two German Patent Applications DE 196 04 055.8 and DE 196 32 222.7 as well as European Patent Document EP 97 102 307.2 and German Patent Document DE 196 42 964.1. The present disclosure content is also not limited to a safety device with a roof air bag system. Any other inventions which result from these documents, such as the vehicle ceiling, the air bags, the process for accommodating and triggering the latter, as well as the use of vehicle components for a safety deice having an air bag system, are considered as being disclosed to the described extent.

What is claimed is:

1. Air bag system comprising:
   an air bag, and
   a gas generator for supplying the air bag with pressure gas during triggering of the air bag system,
   the gas generator and the air bag being connected by a gas distributing duct,
   wherein the gas distributing duct is formed of air bag material, and
   wherein fastening passage holes are provided in at least one of the gas distributing duct and the air bag itself, which fastening passage holes are formed by one of welding connections, glued connections, sewn connections and woven connections and are sealed off with respect to the interior of the at least one of the gas distributing duct and the air bag,
   clips for installing the airbag in the ceiling of a vehicle, the clips passing through the fastening passage holes, and
   wherein at least one clip is connected to a roof holding grip of a vehicle which installs the ceiling of the vehicle whereby the air bag can be installed to vehicle structure conjointly with the vehicle ceiling.

2. Airbag system according to claim 1, wherein the fastening passage holes are formed in an attachment portion of the airbag juxtaposed between and in gas communication with the gas distributing duct and the air bag itself.

3. Airbag system according to claim 1, wherein the air bag advances in a main inflating direction when the air bag system is triggered, and wherein the gas distributing duct extends at least partially at an angle with respect to the main inflating direction of the air bag.

4. Air bag system according to claim 1, wherein the gas distributing duct is integrally constructed with the air bag.

5. Air bag system according to claim 1, wherein the gas distributing duct is formed by a multiple layer material having at least two layers.

6. Air bag system according to claim 5, wherein the multiple layer material of the gas distributing duct is formed by foldings of the air bag material.

7. Air bag system according to claim 1, wherein the gas distributing duct is formed by one of welded connections, glued connections, sewn connections and woven connections of at least two layers of air bag material, and gas passage openings are defined between connections.

8. Air bag system according to claim 1, and further comprising reinforcements placed in the gas distributing duct in at least an area of one of an inflow opening of the pressure gas from the gas generator and where the gas distributing duct has a curved course.

9. Air bag system according to claim 1, and further comprising covering and fastening devices by which the air bag can be accommodated when folded together in its ready position.

10. Air bag system according to claim 9, wherein the covering and fastening devices contain at least one layer of one of non-woven material and paper by which the air bag can be accommodated when folded together in its ready position.

11. Air bag system according to claim 9, wherein the covering and fastening devices are fixedly connected with at least one of the air bag and a vehicle covering.

12. Air bag system according to claim 11, wherein the covering and fastening devices are glued to the at least one of the air bag and the vehicle covering.

13. Air bag system according to claim 1, wherein the fastening passage holes are formed in an attachment portion of the airbag juxtaposed between and in gas communication with the gas distributing duct and the air bag itself.

14. Air bag system according to claim 13 wherein the clips hold the airbag to vehicle structure with the gas distributing duct above the clips and the air bag itself below the clips.

15. Air bag system comprising:

an air bag, said air bag being composed of a flexible material formed into an enclosed integral bag with an axially extending distribution channel integrally formed as part of the bag, the interior of the distribution channel being partially defined by and separated from the remaining interior of the bag by a series of spaced connections which define radial openings therebetween with respect to the axially extending distribution channel to enable communication between the interior of the distribution channel and the remaining interior of the bag, and a gas generator for supplying the air bag with pressure gas during triggering of the air bag system coupled to the axially extending distribution channel so that gas flows axially through the distribution channel and passes radially into the remaining interior of the bag, wherein fastening passage holes are provided in at least one of the gas distributing duct and the air bag itself, which fastening passage holes are formed by one of welding connections, glued connections, sewn connections and woven connections and are sealed gas tight with respect to the interior of the at least one of the gas distributing duct and the air bag, clips for installing the air bag system in the ceiling of a vehicle by clips passing through the fastening passage holes, and wherein at least one clip is connected to a roof holding grip which installs the ceiling and the air bag in position in common to the vehicle structure.

16. Air bag system according to claim 15 wherein the fastening passage holes are formed in an attachment portion of the airbag juxtaposed between and in gas communication with the gas distributing duct and the air bag itself.

17. Air bag system according to claim 15 wherein the air bag is installed in the ceiling of a vehicle by said at least one clip with the gas distributing duct above the clip and the air bag itself below the clip.

* * * * *